INVENTOR
Alvin Huff.
BY
Elmer L. Gunckel
Atty.

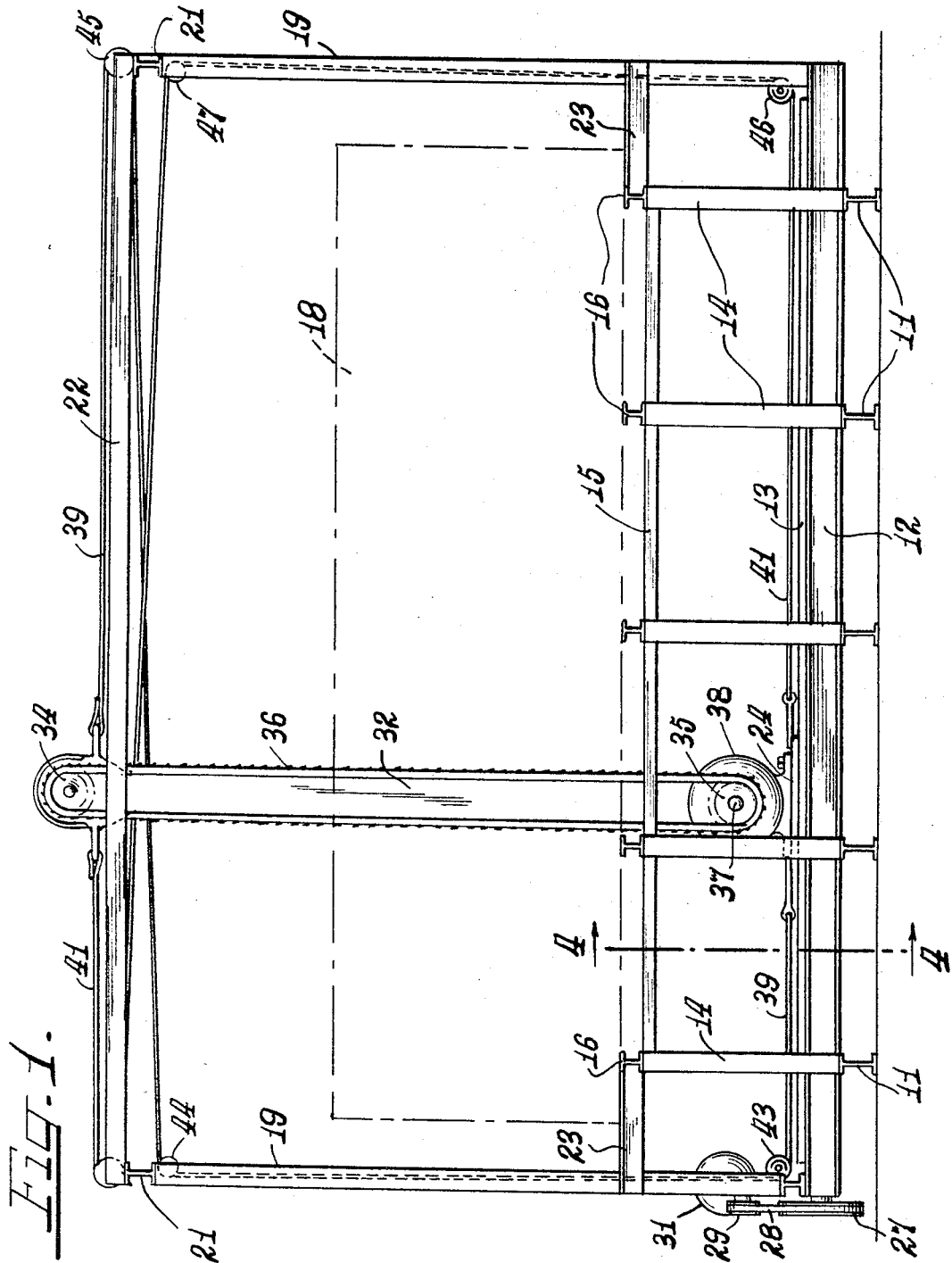

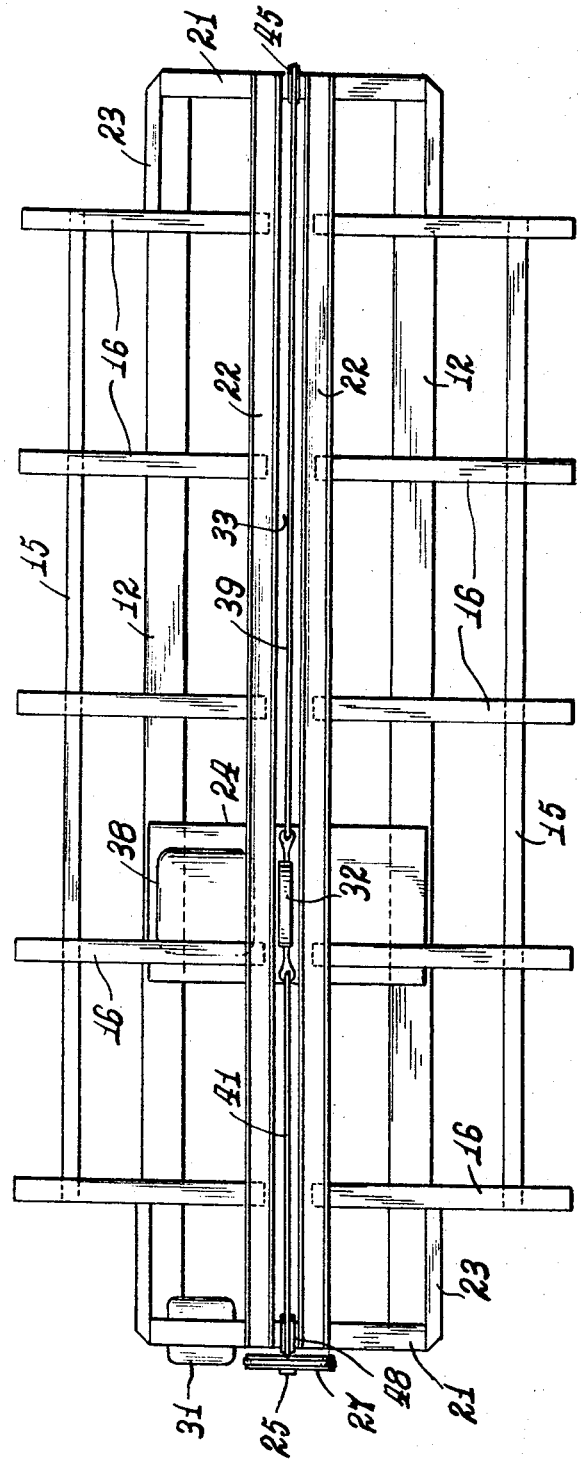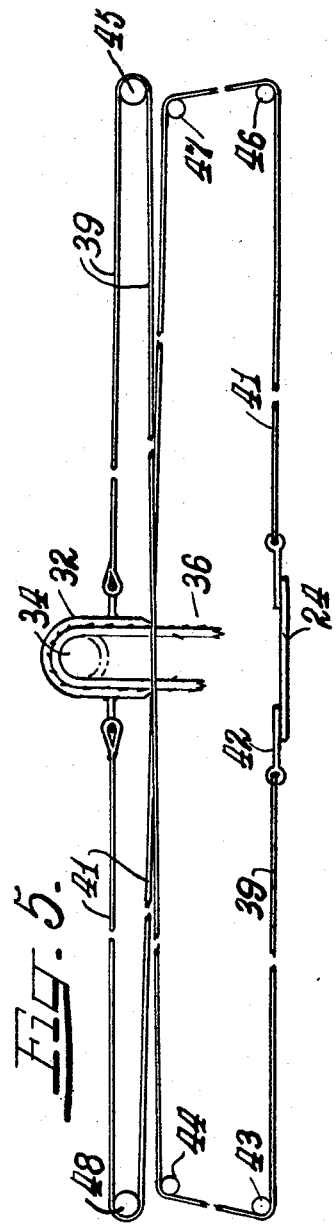

United States Patent Office

3,398,770
Patented Aug. 27, 1968

3,398,770
CHAIN SAW APPARATUS
Alvin Huff, Dubuque, Iowa, assignor to R. S. Bacon Veneer Company, Chicago, Ill., a corporation of Illinois
Filed July 8, 1966, Ser. No. 563,772
7 Claims. (Cl. 143—32)

ABSTRACT OF THE DISCLOSURE

A chain saw apparatus characterized by a work support surface through which a vertically arranged chain saw and frame extends and wherein the frame is guided on tracks at both ends and its advance along said tracks is positively controlled at all times by a connecting cable.

---

The invention relates to improvements in chain saw apparatus and is particularly concerned with the novel construction and assembly of apparatus adapted to support a log in position to be acted upon by a vertically disposed traveling chain saw for ripping large diameter logs lengthwise into halves or quarters.

More particularly, the apparatus includes a log support surface and an associated traveling chain saw assembly that advances lengthwise of the apparatus and is supported on a carriage at a level beneath the log and extends upwardly to have its upper end disposed in an elevated guideway to insure a substantially true vertical cut. The upper free end of the chain saw assembly is connected to the carriage drive means in a novel manner to afford positive advance of the chain saw lengthwise of the log irrespective of the log diameter.

An object of the invention is to provide a traveling chain saw apparatus of the character disclosed.

Another object is to provide, in an apparatus of the character referred to, a novel traveling vertically upstanding chain saw assembly.

Another object is to provide novel means to mount a traveling chain saw.

Another object of the invention is to provide novel means to support a log in a position to be sawed longitudinally.

Another object is to provide apparatus of the character referred to which is portable, inexpensive to construct, easy to maintain and very efficient in use.

The structure by means of which the above noted and other advantages of the invention are attained will be described in the following specification, taken in conjunction with the accompanying drawings, showing a preferred illustrative embodiment of the invention, in which:

FIG. 1 is a side elevational view of the apparatus.

FIG. 2 is a top plan view thereof.

FIG. 5 is a schematic view of the cable arrangement.

Figure 3:
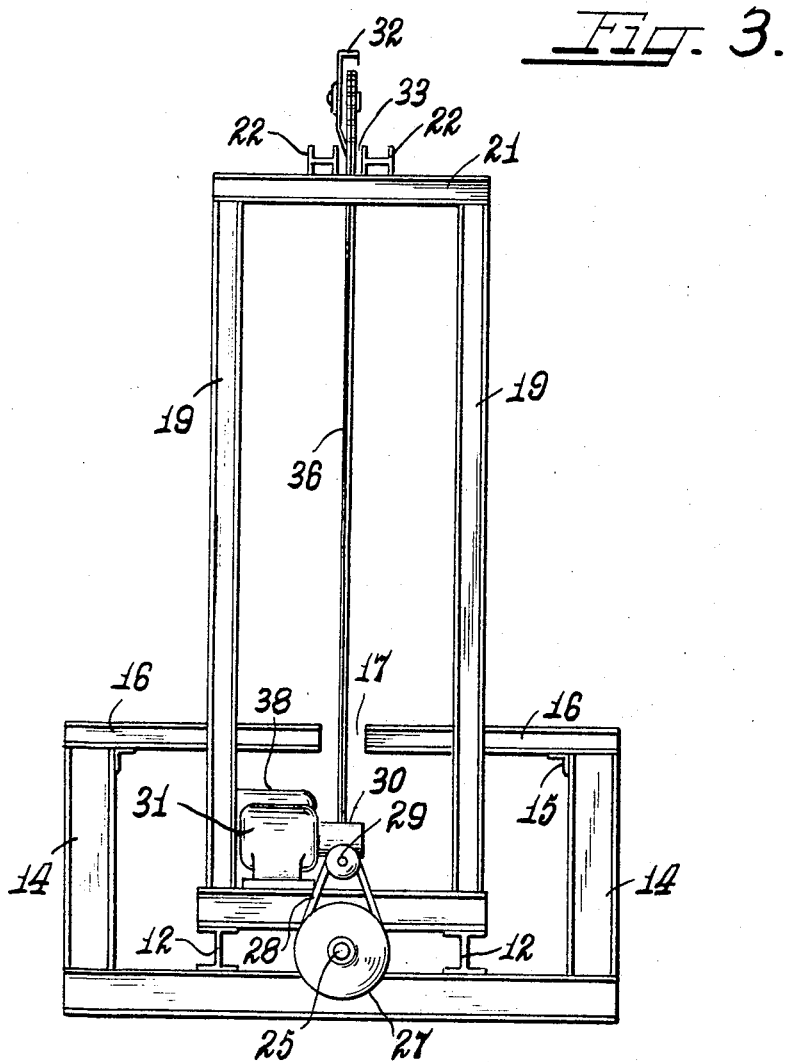
FIG. 3 is an elevational view of the left hand end of the apparatus as viewed in FIG. 1.

Referring to the exemplary embodiment of the apparatus shown in the accompanying drawings, said apparatus includes a base frame structure and a head structure constructed preferably from an assemblage of beams integrally jointed, as by welding, to make a unitary rigid structure. More specifically, the base frame structure includes a plurality of laterally extending longitudinally spaced support beams 11 upon which is secured, inwardly of their outer ends, a pair of longitudinally extending floor beams 12 each preferably having a machined way 13 secured on its upper surface. The laterally projecting ends of the lateral support beams 11 each integrally support an upright 14, the upper ends of which are connected by side brace angles 15 for purposes of rigidity. The upper end of each upright mounts a beam 16 that extends inwardly laterally from each and terminates short of a laterally opposed beam 16 to provide a gap 17. The gaps 17 of successive pairs of beams 16 are in longitudinal alignment for a purpose to be made apparent hereinafter. These beams 16 afford a support surface for a log 18 to be processed.

Mounted at each end of each longitudinal support beams 11 is a standard 19. The pair of standards on each end of the apparatus are bridged by a rigidly secured lateral header beam 21 which supports and has rigidly connected thereto a pair of laterally spaced parallel guide beams 22 constituting the head structure. These guide beams are coextensive in length with the floor beams 12. Stability to the structure is further aided by trusses 23 (FIG. 1) bridging the space between each standard 19 and the related endmost upright 14.

Figure 4:
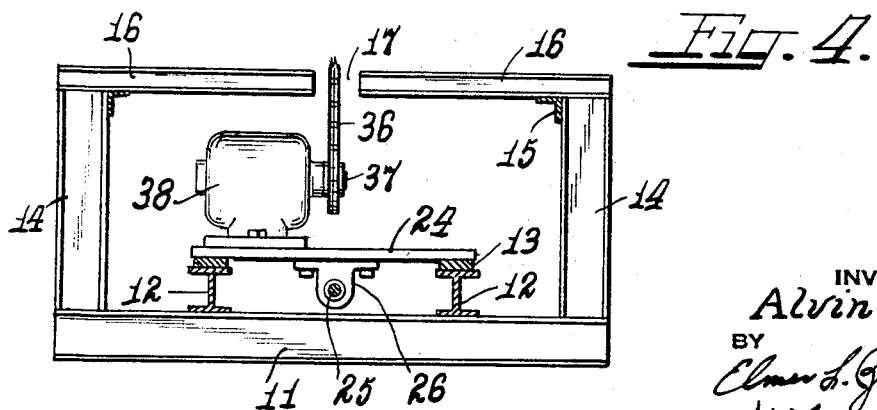
FIG. 4 is a vertical transverse sectional view of the apparatus taken substantially along line 4—4 of FIG. 1.

The floor beams 12 and their ways 13 afford a slide mounting for a carriage 24 which is slidable therealong for substantially the length of the apparatus. The carriage is power driven, as for example, by means of a rotatably driven threaded shaft 25 suitably journalled at its ends and threaded through a bearing 26 (FIG. 4) secured to the underside of the carriage. One end of said shaft mounts a pulley 27 having drive connection, through a belt 28, with a driven pulley 29 carried firmly on the projecting end of a shaft in a reduction gear box 30 mounted on a reversible electric motor 31. It should be apparent that when motor 31 is operating in either direction, the threaded shaft 25 is rotated to advance the carriage to one or the other end of the apparatus. Obviously, a chain drive could be substituted for the threaded shaft drive shown.

Carriage 24 carries a vertically disposed saw frame 32, which extends upwardly through gap 17 and has its upper end passing freely through space 33 between guide beams 22. As shown, the saw frame carries sprockets 34, 35 at opposed ends over which an endless chain saw 36 is trained. The sprocket 34 is an idler sprocket whereas the sprocket 35 is firmly connected to shaft 37 of an electric drive motor 38 mounted firmly on and movable with carriage 24. In order to insure that the saw frame 32 remains substantially vertical at all times and that its upper end advances under power in unison with its carriage mounted end, a series of cables 39, 41 is provided. As best shown in FIG. 5, the cable 39 is secured at one end, as at 42, to carriage 24. It extends longitudinally to the related end of the apparatus where it is trained over a sheave 43 and then carried upwardly around a sheave 44 and then across the apparatus below guide beams 22 and around a sheave 45 and back to the upper end of saw frame 32 to which it is secured. The other cable 41 is likewise trained over sheaves 46, 47 and 48 and then back to saw frame 32 to which it is secured.

In operation, a log 18 is laid upon the log support frame surface defined by beams 16, and braced, while the saw frame is at one end of the apparatus. Operation of the saw is started and the carriage is advanced along the apparatus at a rate of about six inches per minute to carry the chain saw through the log and split same. When the carriage reaches the opposite end of the apparatus, a switch (not shown) is actuated to cut off the electric current to the motors whereupon the carriage and saw frame may be returned to start position by reverse operation of screw drive motor 31. The assembly, being self contained, may be transported readily by means of a lift truck apparatus.

Although I have described a preferred embodiment of the invention, in considerable detail, it will be understood that the description thereof is intended to be illustrative, rather than restrictive, as details of the structure may be modified or changed without departing from the spirit or scope of the invention. Accordingly, I do not desire to be restricted to the exact construction described.

I claim:
1. A chain saw apparatus comprising, an elongated horizontal base frame, a carriage slidable longitudinally on said base frame, a vertical chain saw frame mounted firmly at its lower end on said carriage, a vertical chain saw carried by said chain saw frame, a motor carried by and movable with the carriage for driving said chain saw, a longitudinal guide for the upper end of said chain saw frame, log support means on said base frame above said carriage, said log support means having a longitudinal gap therein through which the chain saw frame and chain saw extends, and means operable to move the carriage and chain saw frame longitudinally in both directions along said base frame.

2. The chain saw apparatus recited in claim 1, in which cables connected with said carriage are connected with the upper end of said chain saw frame to retain it in vertical alignment.

3. The chain saw apparauts recited in claim 1, in which the elevated guide is comprised of laterally spaced parallel beams substantially coextensive with the length of the base frame and between which the upper end of the chain saw frame extends.

4. The chain saw apparatus recited in claim 1, in which screw feed means is provided to move the carriage.

5. The chain saw apparatus recited in claim 4, in which separate motor means is provided for the drive of the screw means.

6. The chain saw apparatus recited in claim 4, in which the screw feed means is substantially coextensive with the length of the base frame and is located beneath the carriage.

7. The chain saw apparatus recited in claim 1, in which the log support means is comprised of longitudinally spaced laterally extending bars arranged in a horizontal plane on opposite sides of the path travelled by the chain saw frame.

References Cited

UNITED STATES PATENTS

| 1,001,272 | 8/1911 | Howard | 143—17 |
| 1,381,418 | 6/1921 | Hunter. | |
| 2,427,038 | 9/1947 | Ashman | 143—17 |
| 2,610,389 | 9/1952 | Bungay | 143—47 |

FOREIGN PATENTS 682,188  11/1952  Great Britain.

DONALD R. SCHRAN, *Primary Examiner.*